(12) United States Patent
Lu et al.

(10) Patent No.: US 12,000,502 B2
(45) Date of Patent: Jun. 4, 2024

(54) FAUCET MAIN BODY STRUCTURE AND INJECTION MOLDING MOLD AND MOLDING METHOD FOR THE SAME

(71) Applicant: PPI XIAMEN INDUSTRY CO., LTD., Xiamen (CN)

(72) Inventors: Wenrong Lu, Xiamen (CN); Guangyi Zeng, Xiamen (CN)

(73) Assignee: PPI XIAMEN INDUSTRY CO., LTD., Xiamen (CN)

( * ) Notice: Subject to any disclaimer, the term of this patent is extended or adjusted under 35 U.S.C. 154(b) by 499 days.

(21) Appl. No.: 16/995,768

(22) Filed: Aug. 17, 2020

(65) Prior Publication Data
US 2021/0054948 A1 Feb. 25, 2021

(30) Foreign Application Priority Data
Aug. 19, 2019 (CN) .......................... 201910762490.1

(51) Int. Cl.
*E03C 1/04* (2006.01)
*B29C 45/17* (2006.01)
*E03C 1/048* (2006.01)
*F16K 31/60* (2006.01)

(52) U.S. Cl.
CPC .......... *F16K 31/60* (2013.01); *B29C 45/1742* (2013.01); *E03C 1/0404* (2013.01); *E03C 1/048* (2013.01)

(58) Field of Classification Search
CPC ............................. E03C 1/0404; E03C 1/0403
See application file for complete search history.

(56) References Cited

U.S. PATENT DOCUMENTS

| | | | |
|---|---|---|---|
| 8,684,025 B2 | 4/2014 | Dai | |
| 9,428,890 B2 * | 8/2016 | Lu | ......................... E03C 1/0403 |

* cited by examiner

*Primary Examiner* — Lauren A Crane

(57) ABSTRACT

A faucet main body structure, an injection molding mold and a molding method are provided. A main body inner core is fixed in the injection molding mold by a new fixing method, ensuring that no additional positioning structure is required to be provided on the outer surface of the main body inner core, so that in the case that the main body inner core is subjected to over-molding, a main body injection-molded layer of the main body injection-molded part is enabled to closely attached to the main body inner core without causing gaps therebetween, which ensures that the faucet main body structure is not susceptible to water seepage, and prolongs the service life of the product.

5 Claims, 15 Drawing Sheets

FAUCET MAIN BODY STRUCTURE AND INJECTION MOLDING MOLD AND MOLDING METHOD FOR THE SAME

This application claims the priority to Chinese Patent Application No. CN201910762490.1, titled "FAUCET MAIN BODY STRUCTURE AND INJECTION MOLDING MOLD AND MOLDING METHOD FOR THE SAME", filed on Aug. 19, 2019 with the Chinese Patent Office, which is incorporated herein by reference in its entirety.

FIELD

The present application relates to the field of sanitary ware, in particular to a faucet main body structure manufactured by secondary plastic injection molding, and an injection molding mold and a molding method for the faucet main body structure.

BACKGROUND

As shown in FIGS. 1 and 2, conventional secondary injection-molded faucets generally have multiple positioning and position-limiting structures on their plastic main body inner cores 1', those structures mainly include a side wall positioning post 11' and a positioning protruding bit 13', for the positioning post 11' to be fitted into a positioning hole in a molding cavity of a rear mold core at a position corresponding to that of the positioning post 11' while the main body inner core 1' (water channel inner core) is placed into the molding cavity of the rear mold core, to preliminarily position the main body inner core 1' inside the molding cavity by the positioning post 11' while the main body inner core 1' is placed in the mold. The main body inner core 1' is further provided with a positioning protruding bit 13' at a lower part thereof, thus, while the main body inner core 1' is placed into the molding cavity, the positioning protruding bit 13' at the lower part exactly stands at the bottom of the molding cavity of the rear mold core, such that the main body inner core 1' can be stably placed inside the molding cavity. When injecting plastic in the secondary injection molding after the mold is closed, since there are structural designs for positioning and position-limiting on both the side wall and the lower part of the main body inner core 1', the main body inner core 1' can be better produced with a smooth appearance in over molding.

However, the process further has the following disadvantages: first, since the main body inner core is manually placed into the molding cavity of the mold core, it is probable that an operator misaligns the positioning post 11' with the positioning hole in the molding cavity due to error, and in such case, when secondarily injecting plastic, if the positioning post 11' is deviated from the insertion position of the positioning hole, the position for placing the main body inner core 1' may also be deviated, and thus a certain gap may be generated between the main body inner core 1' and an over-molded layer 2'. In addition, if the temperature of the mold or the temperature of the plastic is insufficiently high, such that gaps are prone to be generated in areas of the positioning protruding bit 13' and the positioning post 11' of the main body inner core 1' for the over-molded layer 2', and in this case, once the main body inner core 1' of the faucet leaks, the leaked water is prone to seep outwards from the place where the gap is prone to be generated between the above described main body inner core 1' and the over-molded layer 2', causing water dripping and leaking to occur during use of the product.

SUMMARY

A first aspect of the present application is to provide a faucet main body structure that has a low manufacturing cost and is not prone to leakage.

A second aspect of the application is to provide a mold for manufacturing the faucet main body structure.

A third aspect of the present application is to provide a method for manufacturing a faucet main body structure using the mold.

In order to achieve the first aspect of the application, a faucet main body structure is disclosed according to the present application, which includes a main body inner core, a main body injection-molded part and two metallic pipes. The main body inner core is composed of a through pipeline and a water-passing joint which are integrally injection-molded. The through pipeline is penetrated axially, and has inwardly concaved circular arc-shaped cutouts arranged at its two ends, and an outer contour surface of the through pipeline is a circular arc-shaped transitional surface. The water-passing joint is arranged at a radial position of the through pipeline and perpendicularly cross the through pipeline. The water-passing joint is cylindrical, and is penetrated in the axial direction, and has radial ends in communication with a waterway in the through pipeline. The water-passing joint has an axial length X and a radial length Y, both of which are greater than the longest distance Z between radial ends of the through pipeline, and also an outer surface of each of the through pipeline and the water-passing joint is smooth. The main body injection-molded part includes a main body injection-molded layer, two valve spool accommodating chambers and two water inlet pipes. The main body injection-molded layer is over-molded on an outer surface of the main body inner core, and has an upper water outlet and a lower water outlet extending outwards at the water-passing joint. The two valve spool accommodating chambers are respectively located at outer sides of the circular arc-shaped cutouts on the two sides of the through pipeline. Each of the valve spool accommodating chambers is hollow inside, and has a chamber wall facing towards the through pipeline side tangent to the circular-arc shaped cutout of the through pipeline. The two water inlet pipes are respectively located at lower ends of the two valve spool accommodating chambers, and the water inlet pipes are in communication with waterways of the valve spool accommodating chambers respectively; and the two water inlet pipes are respectively fixedly arranged inside the metallic pipes.

With the above structure, the outer contour surface of the main body inner core has a circular arc-shaped transition surface, and the outer surface thereof is smooth without any additional positioning structures provided for fixing the main body inner core, and further, the water-passing joint and the through pipeline perpendicularly cross each other, and a stepped flange is formed at the junction between the water-passing joint and the through pipeline, so that the injection-molded layer of the faucet main body structure can be more closely attached to the outer surface of the main body inner core in the process of the secondary injection molding, to minimize the gap therebetween, even if the main body inner core leaks water, the main body injection-molded layer closely attached to the main body inner core can have effective water-proof and sealing effect and prevent the main body of the faucet from leaking water.

In order to achieve the second aspect of the present application, an injection molding mold for a faucet main body structure is disclosed according to the present application, the injection molding mold includes a movable mold assembly and a fixed mold plate, and the movable mold assembly is moveable back and forth relative to the fixed mold plate. The movable mold assembly includes a movable mold clamping plate, a movable mold support plate, and a movable mold plate in the listed sequence from the outside to the inside. The movable mold plate is further provided, on a side facing towards the fixed mold plate, with a rear mold cavity. The movable mold plate is further provided with an upper slider and a lower slider, and the upper slider and the lower slider are separately controlled by their respective oil cylinders to be moveable up and down at the rear mold cavity side of the movable mold plate. Specifically, the upper slider is provided at the bottom thereof with a left valve spool core and a right valve spool core which are configured to hollow the inner chambers of the valve spool accommodating chambers and a middle upper water outlet core configured to hollow an inner chamber of the upper water outlet of the main body injection-molded layer. The middle upper water outlet core is configured to be inserted into the upper end of the water-passing joint to have an interference fit with the water-passing joint. The distance between the left valve spool core and the right valve spool core is exactly consistent with the distance between the circular arc-shaped cutouts at the two ends of the through pipeline of the main body inner core, and the radians of the convex outer walls of the left valve spool core and the right valve spool core are consistent with the radians of the concave portions of the circular arc-shaped cutouts at the two ends of the through pipeline, to ensure that the two ends of the through pipeline abut against the outer walls of the left valve spool core and the right valve spool core. The lower slider is provided at an upper part thereof with a left water channel core and a right water channel core which are configured to hollow inner chambers of the water inlet pipes and a middle lower water outlet core configured to hollow an inner chamber of the lower water outlet of the main body injection-molded layer, and the middle lower water outlet core is configured to abut against a lower end of the water-passing joint. The movable mold clamping plate is provided, on a side facing towards the movable mold plate, with an ejector support plate and an ejector retainer plate which are movable back and forth; a set of ejector pins is perpendicularly fixed to the ejector retainer plate and abuts against the ejector support plate, and front heads of the ejector pins pass through the movable mold support plate and the movable mold plate and are located at the rear mold cavity, and the ejector pins are moveable back and forth along with the back and forth movement of the ejector support plate. The fixed mold plate is provided, on a side facing towards the movable mold plate, with a front mold cavity. The movable mold support plate is perpendicularly fixedly provided with guide posts on a side facing towards the movable mold plate, and font ends of the guide posts pass through the periphery of the movable mold plate, and the guide posts are moveable back and forth along with the back and forth movement of the movable mold support plate. The fixed mold plate is also provided with guide post insertion holes in the periphery thereof, and when the movable mold plate moves forward to abut tightly against the fixed mold plate, the guide posts on the movable mold support plate pass through the periphery of the movable mold plate and are further inserted into the guide post insertion holes in the periphery of the fixed mold plate, and in this case, the rear mold cavity of the movable mold plate and the front mold cavity of the fixed mold plate are closed to each other to form a complete mold cavity, and the complete mold cavity is consistent in shape with the product of the main body injection-molded part. The movable mold plate and the fixed mold plate are each fixedly provided with multiple pairs of positioning pins on side walls thereof, and each pair of positioning pins is provided thereon with a puller bar, and the puller bar is provided with a position-limiting sliding slot, and the positioning pins are nested in the position-limiting sliding slot and is moveable relatively in the position-limiting slot, the separation between the movable mold plate and the movable mold support plate is achieved by means of the puller bar.

To achieve the third aspect of this application, a molding method for a faucet main body structure is disclosed according to the application, which includes the following steps 1 to 7.

In step 1, a movable mold clamping plate and a movable mold support plate are pulled away from a movable mold plate, to cause an ejector support plate and an ejector retainer plate of the movable mold clamping plate to move backward along with the movable mold clamping plate; and cause guide posts on the movable mold support plate to also move backward along with the movable mold support plate; specifically, an upper slider of the movable mold plate slides upwards and a lower slider of the movable mold plate slides downwards, to allow a rear mold cavity of the movable mold plate to open.

In step 2, a left metallic pipe and a right metallic pipe are sleeved on a left water channel core and a right water channel core of the lower slider respectively; and an upper end of a water-passing joint of a main body inner core upwardly is sleeved onto a middle upper water outlet core below the upper slider to have an interference fit with the middle upper water outlet core, and circular arc-shaped cutouts at two ends of the main body inner core exactly are tightly fitted against inner side walls of a left valve spool core and a right valve spool core below the upper slider, to allow the main body inner core to be stably arranged under the upper slider and will not fall off.

In step 3, the upper slider is pushed by an upper slider oil cylinder to move downwards, while the lower slider is pushed by a lower slider oil cylinder to move upwards, to allow the left valve spool core and the right valve spool core of the upper slider to respectively approach downwards upper ends of the left metallic pipe and the right metallic pipe to form molding cavities of water inlet pipes; and to allow a middle lower water outlet core of the lower slider to be inserted into a lower end of the water-passing joint of the main body inner core and tightly abut against the lower end of the water-passing joint.

In step 4, the movable mold clamping plate is driven to push the movable mold plate inwards, to close the movable mold plate and a fixed mold plate to each other to form a complete mold cavity, and the main body inner core, the left metallic pipe and the right metallic pipe are preset in the complete mold cavity.

In step 5, a molten plastic liquid is injected through an injection molding port in the fixed mold plate for secondary injection molding, and is cooled and molded into the faucet main body structure;

In step 6, after the injection molding, the oil cylinders are controlled first to move the upper slider upwards and the lower slider downwards to separate the faucet main body structure from the upper slider and the lower slider to perform core pulling, and then the movable mold plate is separated from the fixed mold plate.

In step 7, after the core pulling is performed, the movable mold plate is separated from the fixed mold plate, to allow the movable mold plate, due to being restricted by the puller bar, to be separated from the movable mold support plate, and then an ejector support plate and an ejector retainer plate of the movable mold clamping plate are pushed towards the movable mold plate, to allow front heads of the ejector pins to pass through the movable mold support plate and the movable mold plate, and further eject the molded faucet main body structure out to separate it from the injection molding mold to complete the product collection.

The main inventive step of the faucet main body structure made by this kind of mold and molding method lies in the method for fixing the main body inner core, which is different from the method of using positioning posts or positioning protruding bits to fix the main body inner core in the injection molding mold cavity in the prior art, and in the method for fixing the main body inner core according to the present application, the left valve spool core and the right valve spool core of the upper slider are directly used to fix the main body inner core in the length direction, and the middle upper water outlet core is inserted into the upper end of the water-passing joint of the main body inner core to have an interference fit with it, and the middle lower water outlet core of the lower slider abuts against the lower end of the water-passing joint of the main body inner core, thereby stably fixing the main body inner core in the length direction and the width direction, and also ensuring that by secondary injection molding with this mold, the main body injection-molded layer can be closely attached to the outer surface of the main body inner core to avoid water leakage of the faucet main body structure.

DETAILED DESCRIPTION OF EMBODIMENTS

The present application is described in detail hereinafter with reference to the drawings and embodiments.

Figure 1:
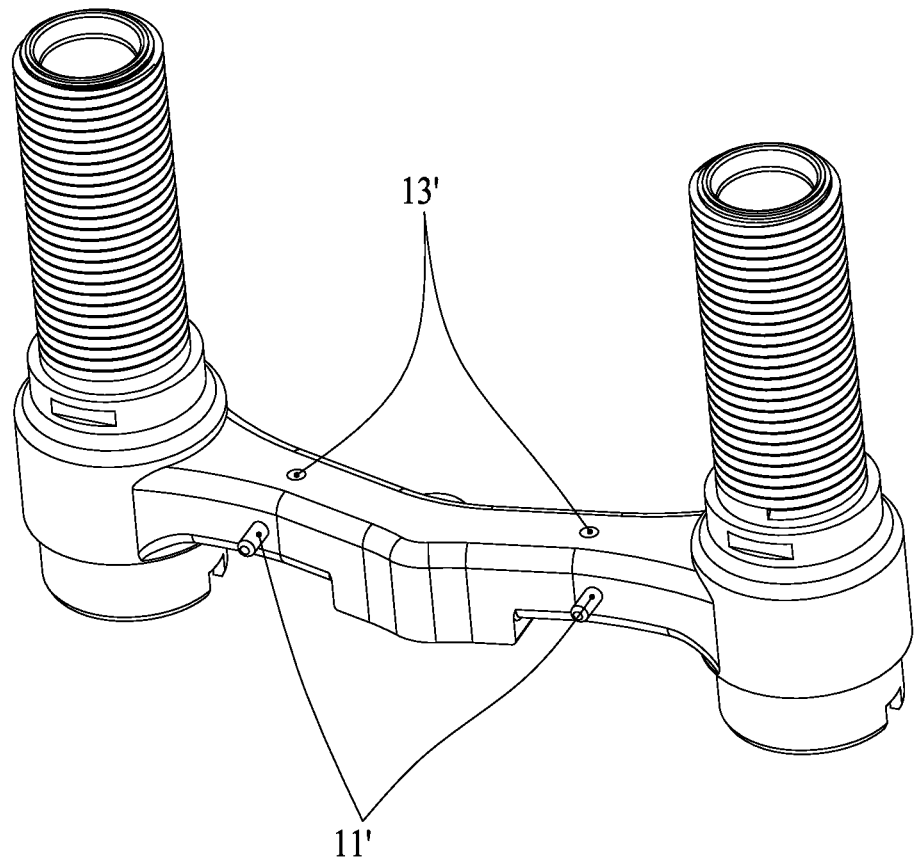
FIG. 1 is a first schematic diagram of the background technology.
Figure 2:
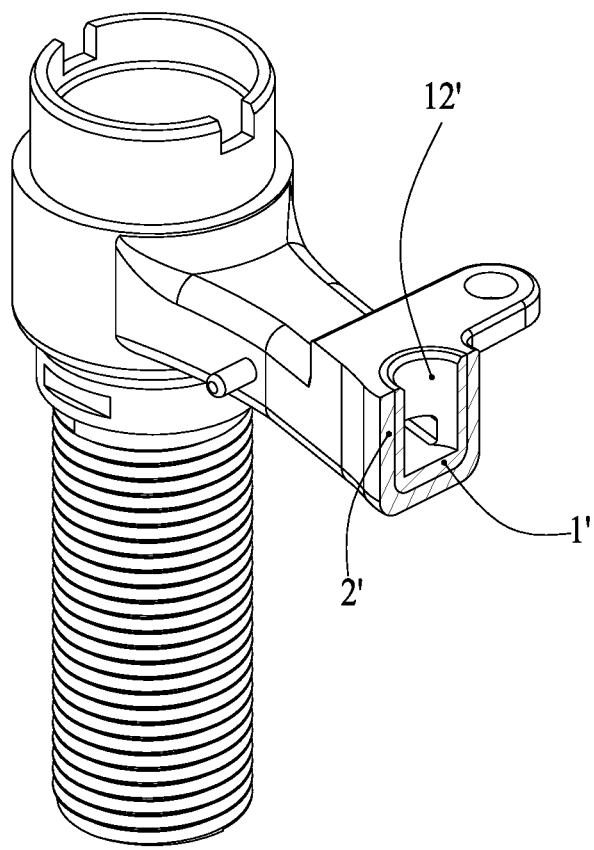
FIG. 2 is a second schematic diagram of the background technology.
Figure 3:
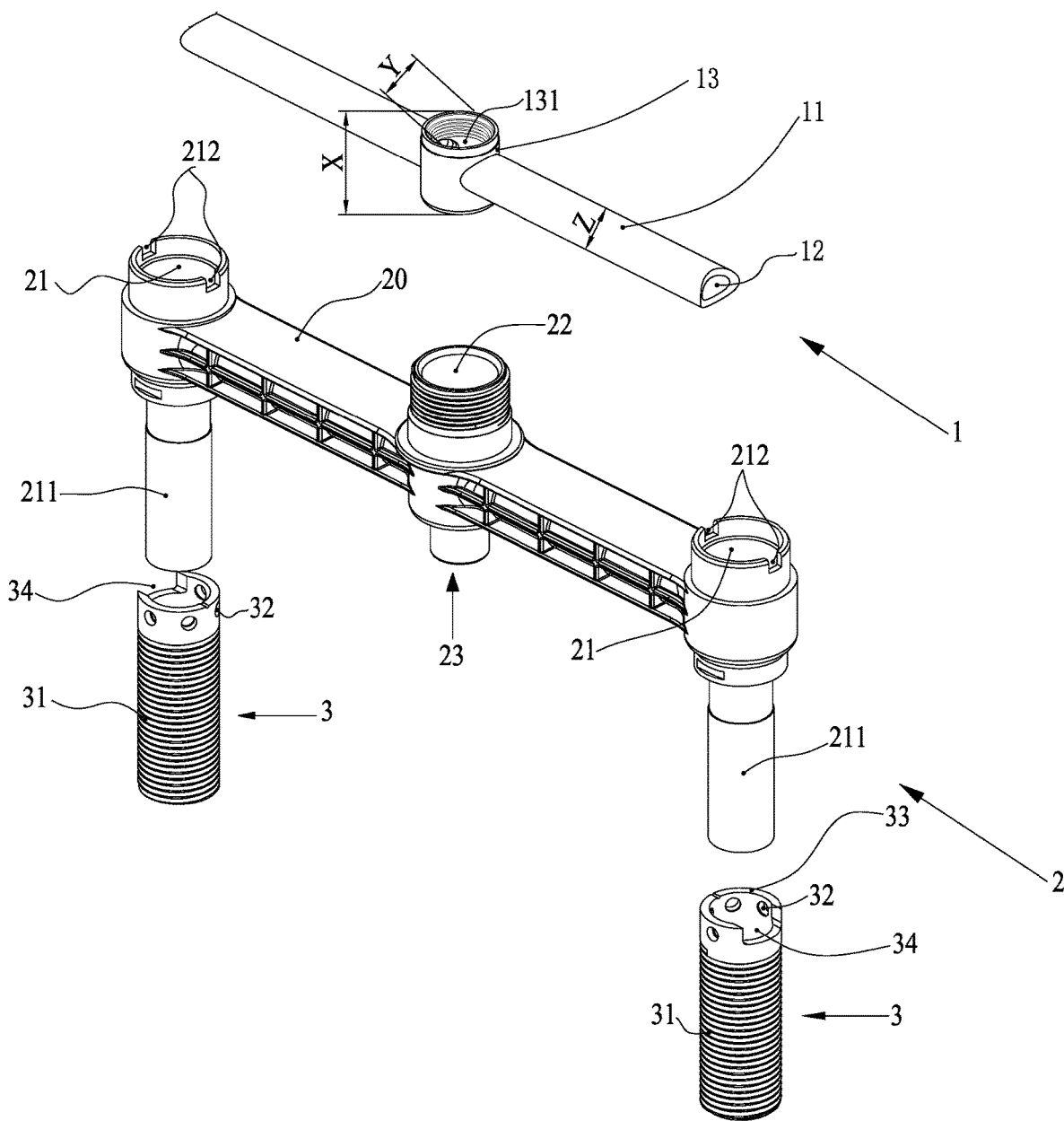
FIG. 3 is an exploded view of a faucet main body structure according to the present application showing parts.
Figure 4:
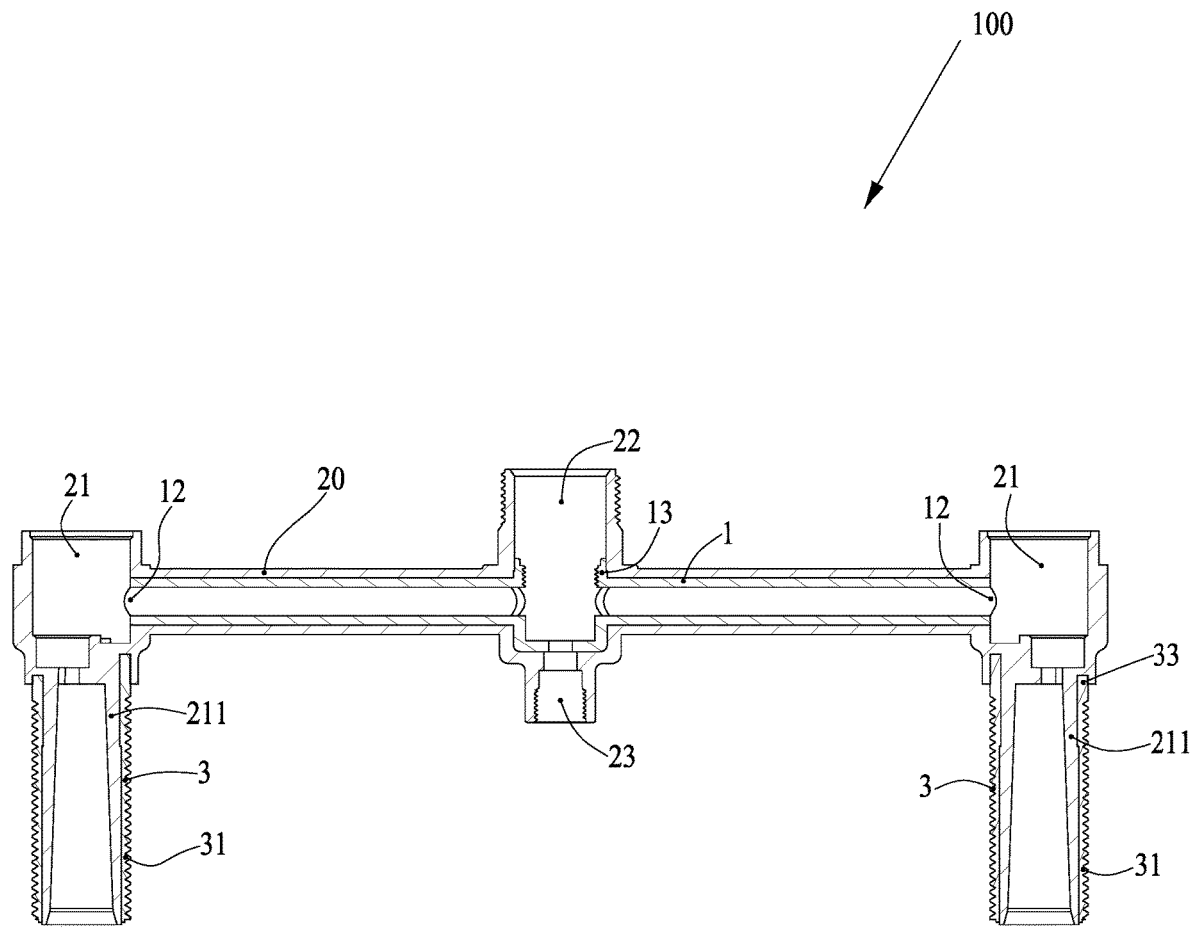
FIG. 4 is a schematic sectional view of the faucet main body structure according to the present application.

As shown in FIGS. 3 and 4, a faucet main body structure 100 includes a main body inner core 1, a main body injection-molded part 2, and metallic pipes 3 on the left and right sides. The main body inner core 1 is a through pipeline 11. The through pipeline 11 is penetrated longitudinally, and has inwardly concaved circular arc-shaped cutouts 12 arranged at two ends thereof, and a water-passing joint 13 arranged in the middle to perpendicularly cross the through pipeline 11. The water-passing joint 13 is cylindrical, it is penetrated in the axial direction, and its radial ends are in communication with a waterway in the through pipeline 11. The water-passing joint 13 has an axial length X and a radial length Y, both of which are greater than the longest distance Z between radial ends of the through pipeline 11, thus ensuring that a cross is formed between the water-passing joint 13 and the through pipeline 11, for the main body injection-molded layer 20 to be firmly over-molded on the main body inner core 1 and not slip along its longitudinal direction in the subsequent secondary injection molding, and also an outer surface of each of the through pipeline 11 and the water-passing joint 13 is smooth. The main body injection-molded part 2 includes a main body injection-molded layer 20, two valve spool accommodating chambers 21 and two water inlet pipes 211. The main body injection-molded layer 20 is over-molded on the main body inner core 1, and has an upper water outlet 22 and a lower water outlet 23 extending outwards at the water-passing joint 13. The two valve spool accommodating chambers 21 are respectively located at outer sides of the circular arc-shaped cutouts 12 on the two sides of the through pipeline 11. Each of the valve spool accommodating chambers 21 is hollow inside, and has a chamber wall facing towards the through pipeline 11 side tangent to the circular-arc shaped cutout 12 of the through pipeline 11, such that each of the valve spool accommodating chambers 21 is in communication with the waterway of the through pipeline 11. The two water inlet pipes 211 are respectively located at lower ends of the two valve spool accommodating chambers 21, and the water inlet pipes 211 are in communication with waterways of the valve spool accommodating chambers 21 respectively. The two water inlet pipes 211 have the metallic pipes 3 respectively fixedly arranged thereon.

The metallic pipes 3 on the two sides are preferably copper pipes, and alternatively stainless steel pipes. Each of the metallic pipes 3 has an outer wall provided with external screw threads 31, and has a top end 33 provided with a number of positioning perforations 32 and a feeding gap 34. The secondary injection-molded water inlet pipes 211 are insert-molded into the metallic pipes 3 on the two sides and over-molded on the top ends 33 of the metallic pipes 3 on the two sides respectively, as shown in FIG. 4, and are also filled in the positioning perforations 32, for the metallic pipes 3 to be firmly fixed onto the water inlet pipes 211 respectively.

The water-passing joint 13 is provided with internal screw threads 131 on its inner wall at its upper end; and the upper water outlet 22 of the main body injection-molded layer 20 is provided with external screw threads 221 on its outer wall, and the lower water outlet 23 of the main body injection-molded layer 20 is provided with internal screw threads 231 on its inner wall.

The valve spool accommodating chamber 21 molded in the main body injection molded part 2 has two valve spool positioning notches 212 formed on an upward side of its chamber wall.

Figure 13:
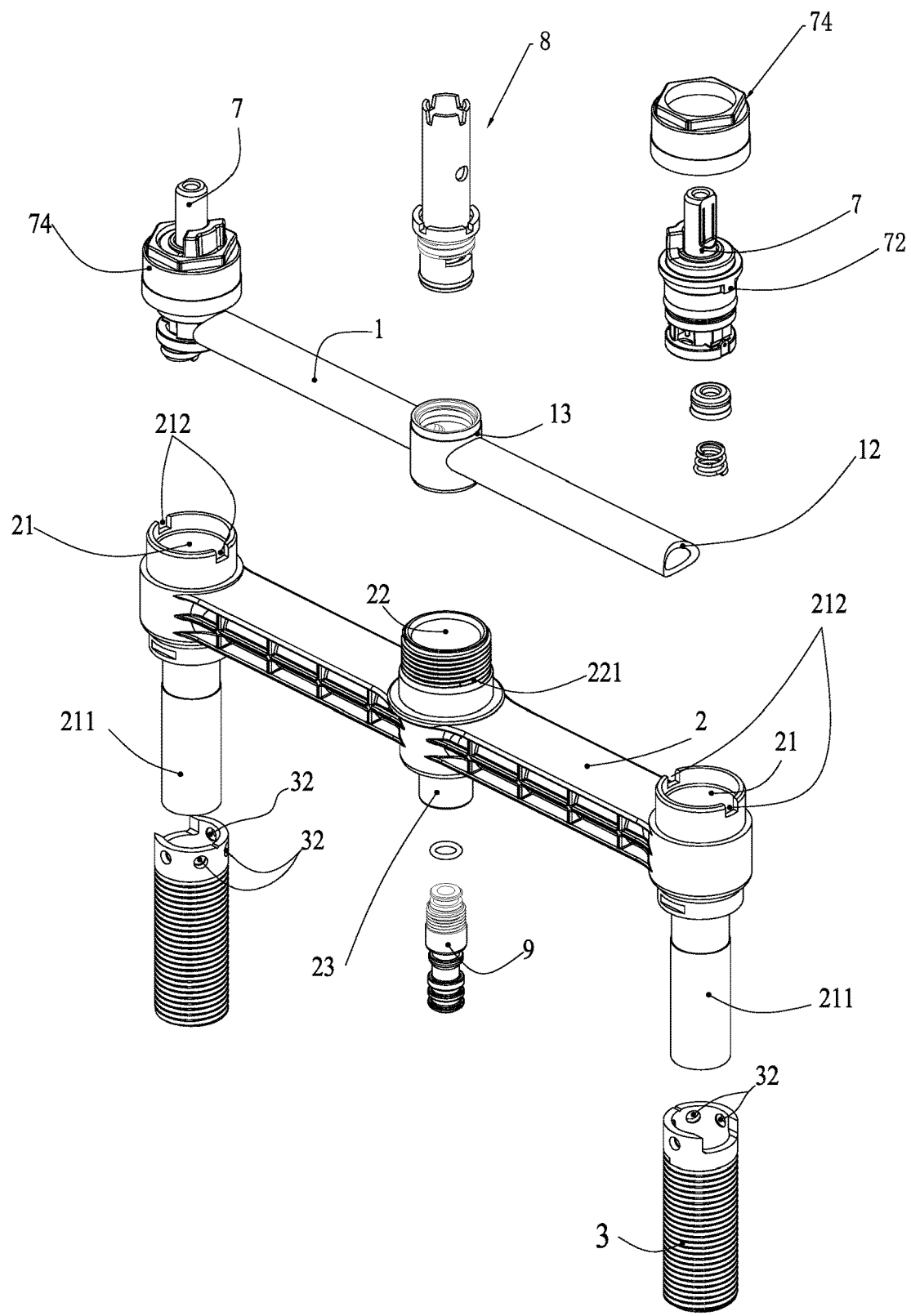
FIG. 13 is an exploded view of an assembled valve spool of the faucet main body structure according to the present application showing the parts.
Figure 14:
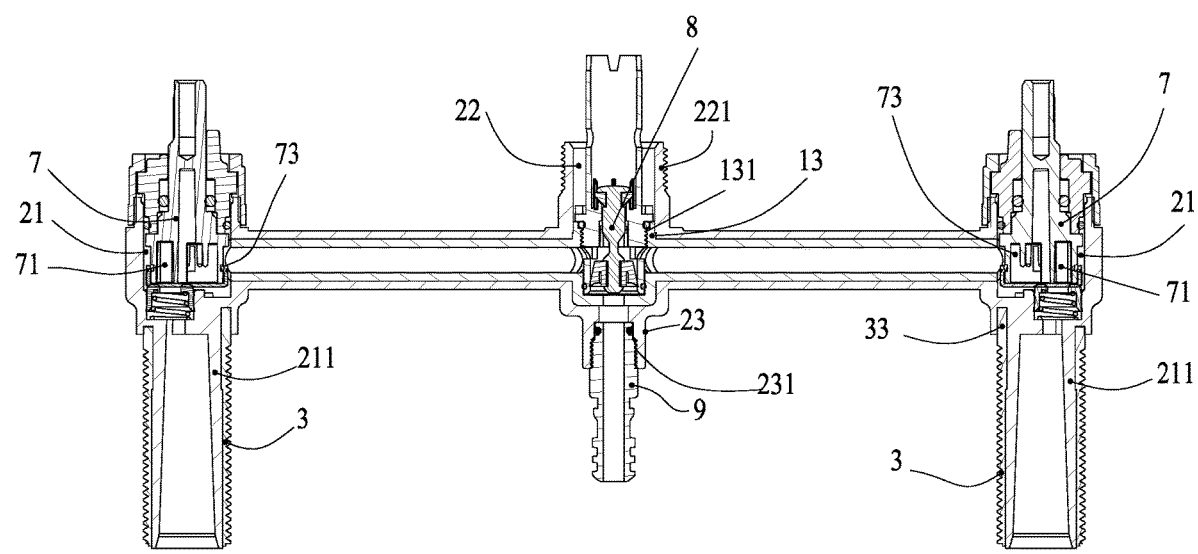
FIG. 14 is a schematic sectional view of the assembled valve spool of the faucet main body structure according to the present application.
Figure 15:
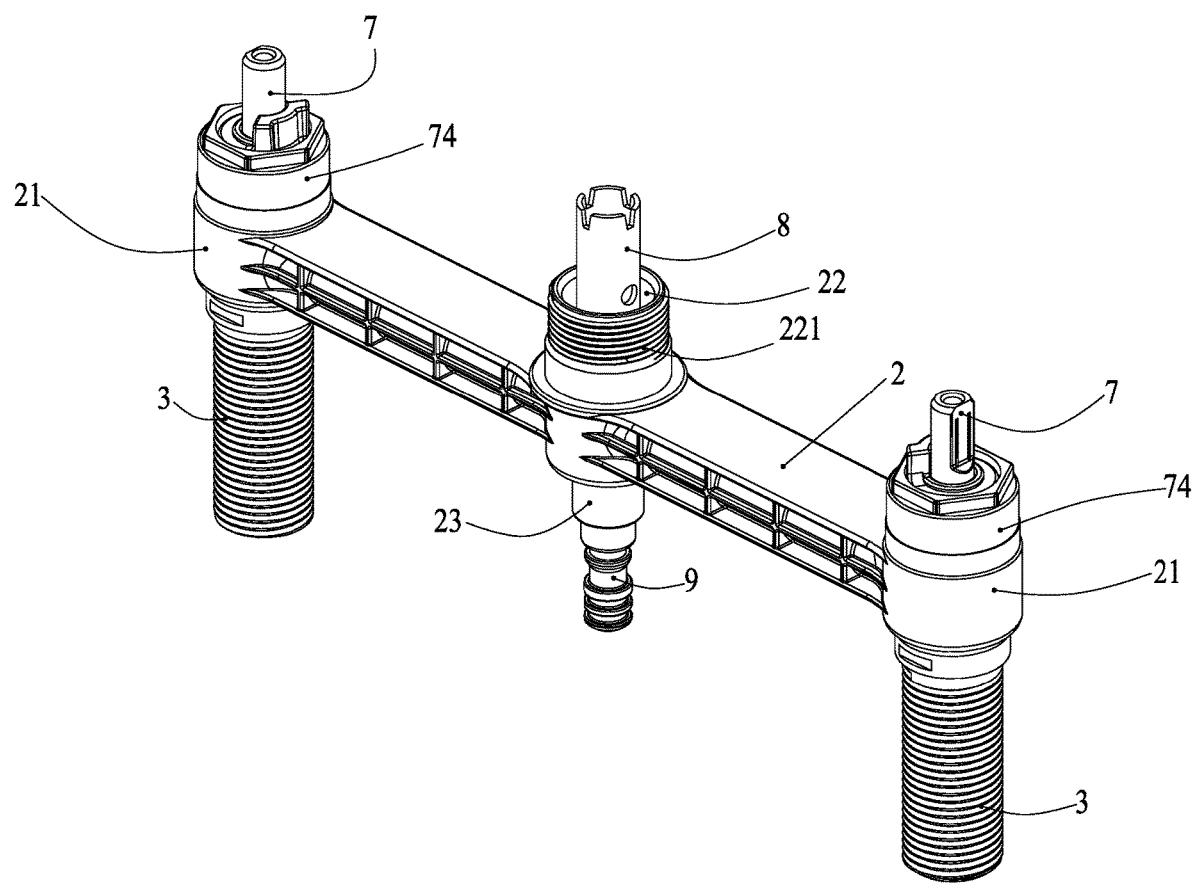
FIG. 15 is a perspective view of the assembled valve spool of the faucet main body structure according to the present application.

As shown in FIGS. 13 to 15, the present application discloses an embodiment of installing a valve spool by using the above-described faucet main body structure 100. Switching valve spools 7 are respectively placed in the valve spool accommodating chambers 21 at the two ends of the faucet main body structure 100, and positioning blocks 72 of two side walls of the switching valve spool 7 are engaged into the valve spool positioning notches 212 of the valve spool accommodating chamber 21 respectively for positioning. A valve spool cover 74 is further used to press the valve spool inside the valve spool accommodating chamber 21, to allow a water inlet 71 of the valve spool 7 to face towards an inner cavity of the water inlet pipe 211 corresponding to and in communication with the water inlet 71 of the valve spool 7, and to allow a water outlet 73 of the valve spool 7 to face towards the corresponding circular arc-shaped cutout 12 of the main body inner core 1. A waterway switching valve 8 is arranged in the water-passing joint 13 and is threadedly connected in a sealed manner to the internal screw threads 131 on an upward side of the water-passing joint 13. The outer wall of the upper water outlet 22 is threadedly connected by the external screw threads 221 thereon to a water outlet faucet (not shown), and an inner wall of the lower water outlet 23 is provided with internal screw threads 231 and is screwed therein a quick connector 9 for connecting an injection gun (not shown). The water inlet pipes 211 on the two sides are utilized respectively for inflow of cold water and hot water, and the switching valve spools 7 on the two sides are utilized to respectively control the inflow rate of the cold and hot water on the two sides, and the middle waterway switching valve 8 is utilized to control the outflow of the mixed water through the upper water outlet 22 or the lower water outlet 23. The dual faucet manufactured thereby has a tightly sealed faucet main body structure, and its waterway is sealed in the main body injection-molded part 2, which is less susceptible to water seepage, improves the product's service life and reduces the user's use cost.

Figure 10:
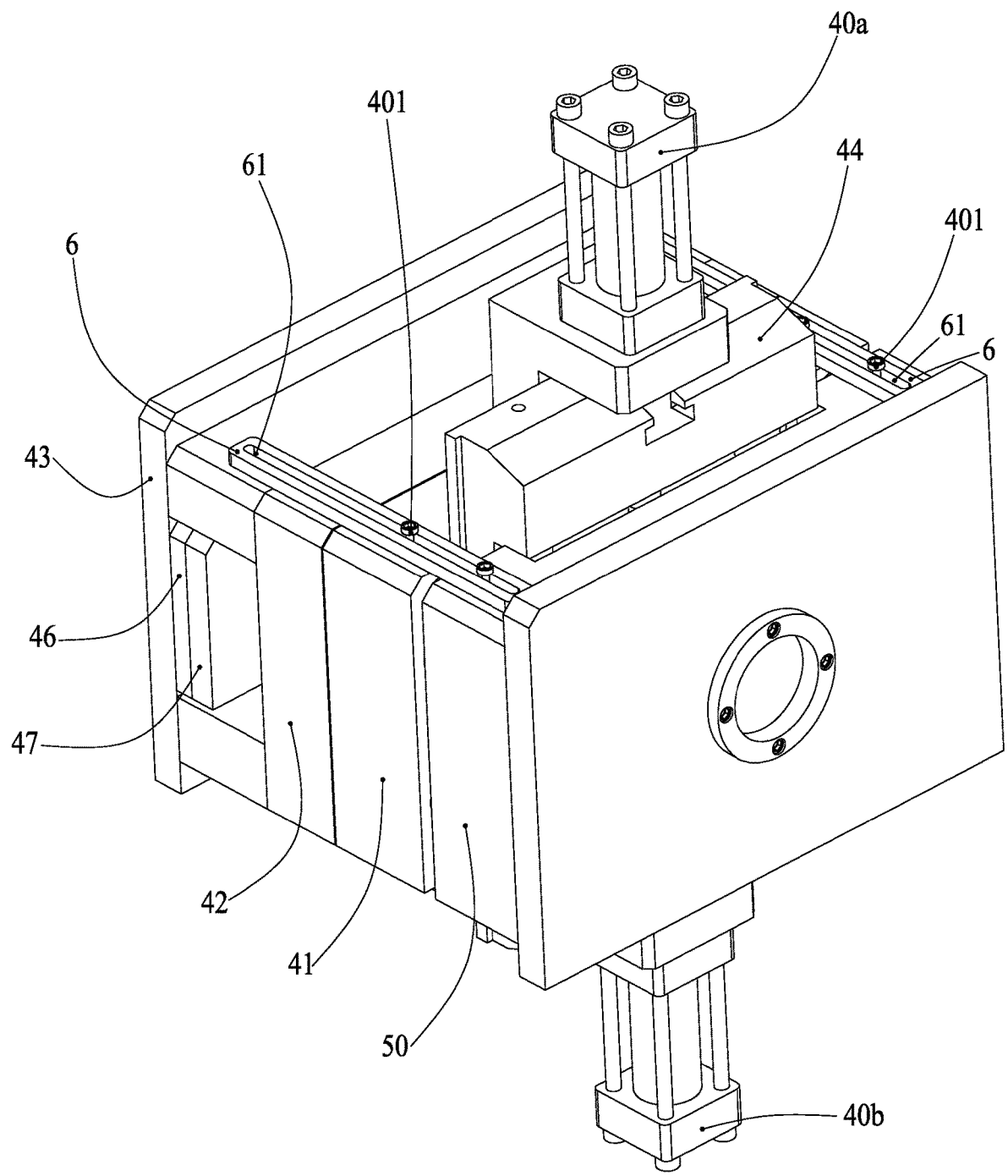
FIG. 10 is a schematic diagram showing that the movable mold plate and the fixed mold plate according to the present application in a closed state, while the upper slider and the lower slider in a parted state.
Figure 11:
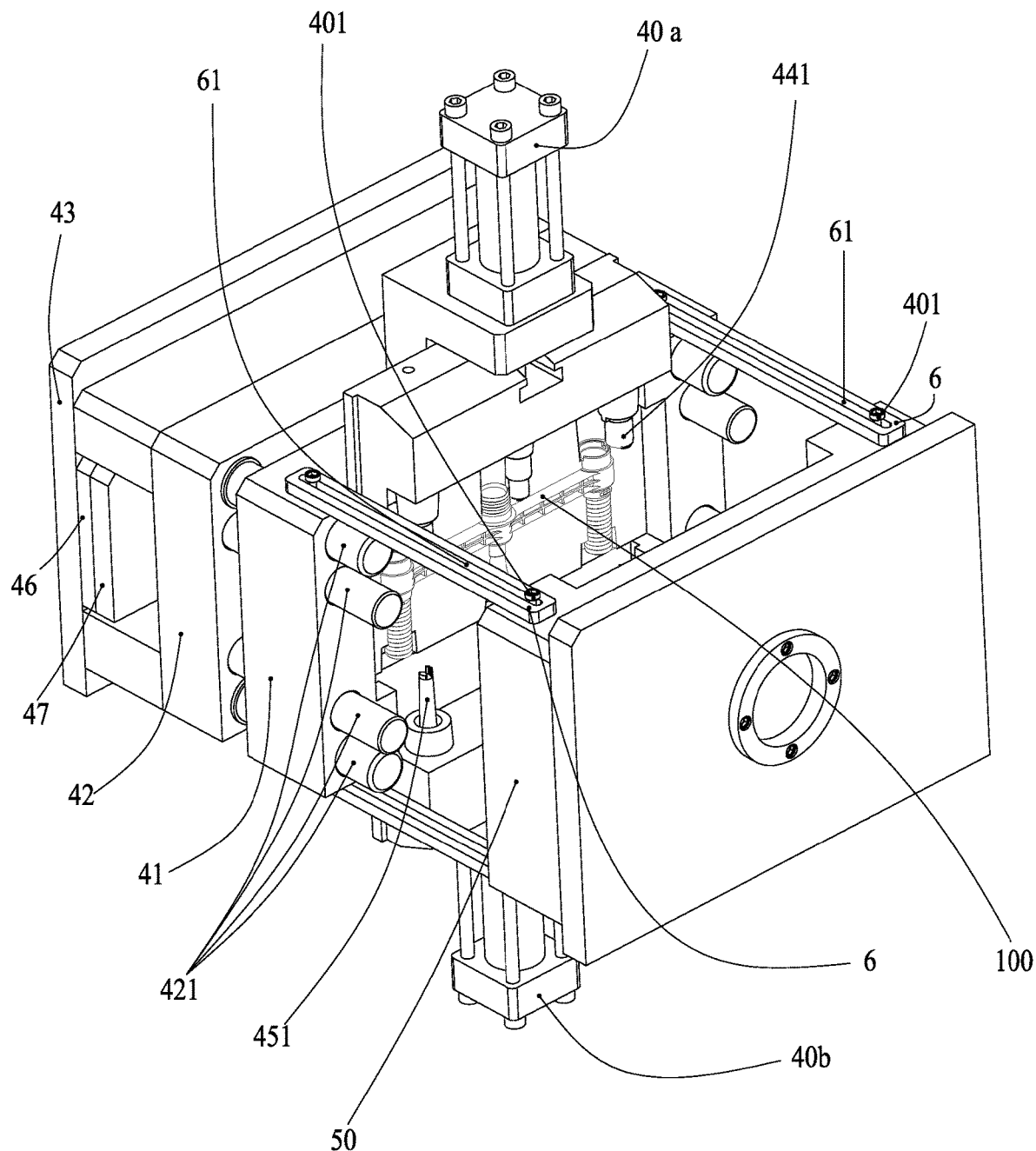
FIG. 11 is a schematic diagram showing the movable mold plate is parted from the fixed mold plate to a limit position.
Figure 12:
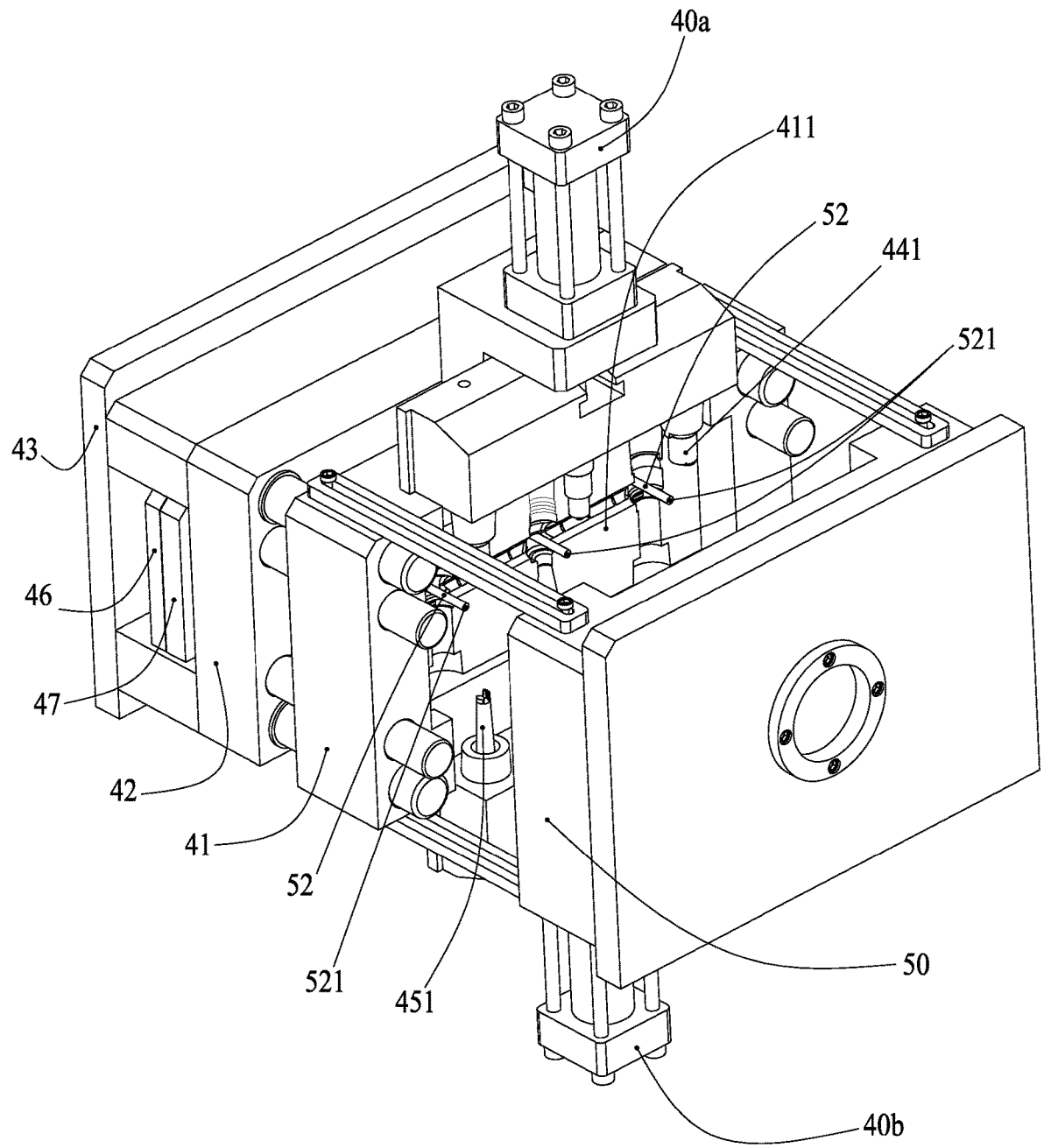
FIG. 12 is a schematic diagram showing that the movable mold plate and the movable mold support plate are parted from each other, and an ejector support plate and an ejector retainer plate move toward the movable mold support plate and eject the faucet main body structure out according to the present application.

As shown in FIGS. 5 to 12, the present application further discloses an injection molding mold configured to manufacture the faucet main body structure, the injection molding mold includes a movable mold assembly 4 and a fixed mold plate 50. The movable mold assembly 4 is moveable back and forth relative to the fixed mold plate 50. Specifically, the movable mold assembly 4 includes a movable mold clamping plate 43, a movable mold support plate 42 and a movable mold plate 41 in the listed sequence from the outside to the inside. The movable mold plate 41 is provided, on a side facing towards the fixed mold plate 50, with a rear mold cavity 411 preset according to the shape of the desired injection-molded product. A movable mold support plate 42 and a movable mold clamping plate 43 are provided at a rear side of the movable mold plate 41 in the listed sequence. The movable mold clamping plate 43 is provided, on a side facing toward the movable mold plate 41, with an ejector support plate 46 and an ejector retainer plate 47 which are moveable back and forth, as shown in FIG. 12, a set of ejector pins 52 is perpendicularly fixed to the ejector retainer plate 47 and abuts against the ejector support plate 46. Front head 521 of the ejector pins 52 pass through the movable mold support plate 42 and the movable mold plate 41, and the ejector pins 52 are moveable back and forth along with the back and forth movement of the ejector support plate 46; the movable mold support plate 42 is perpendicularly fixedly provided with multiple sets of guide posts 421 on a side facing towards the movable mold plate 41. Front ends 422 of the guide posts 421 pass through the periphery of the movable mold plate 41, and the guide posts 421 are moveable back and forth along with the back and forth movement of the movable mold support plate 42.

Figure 6:
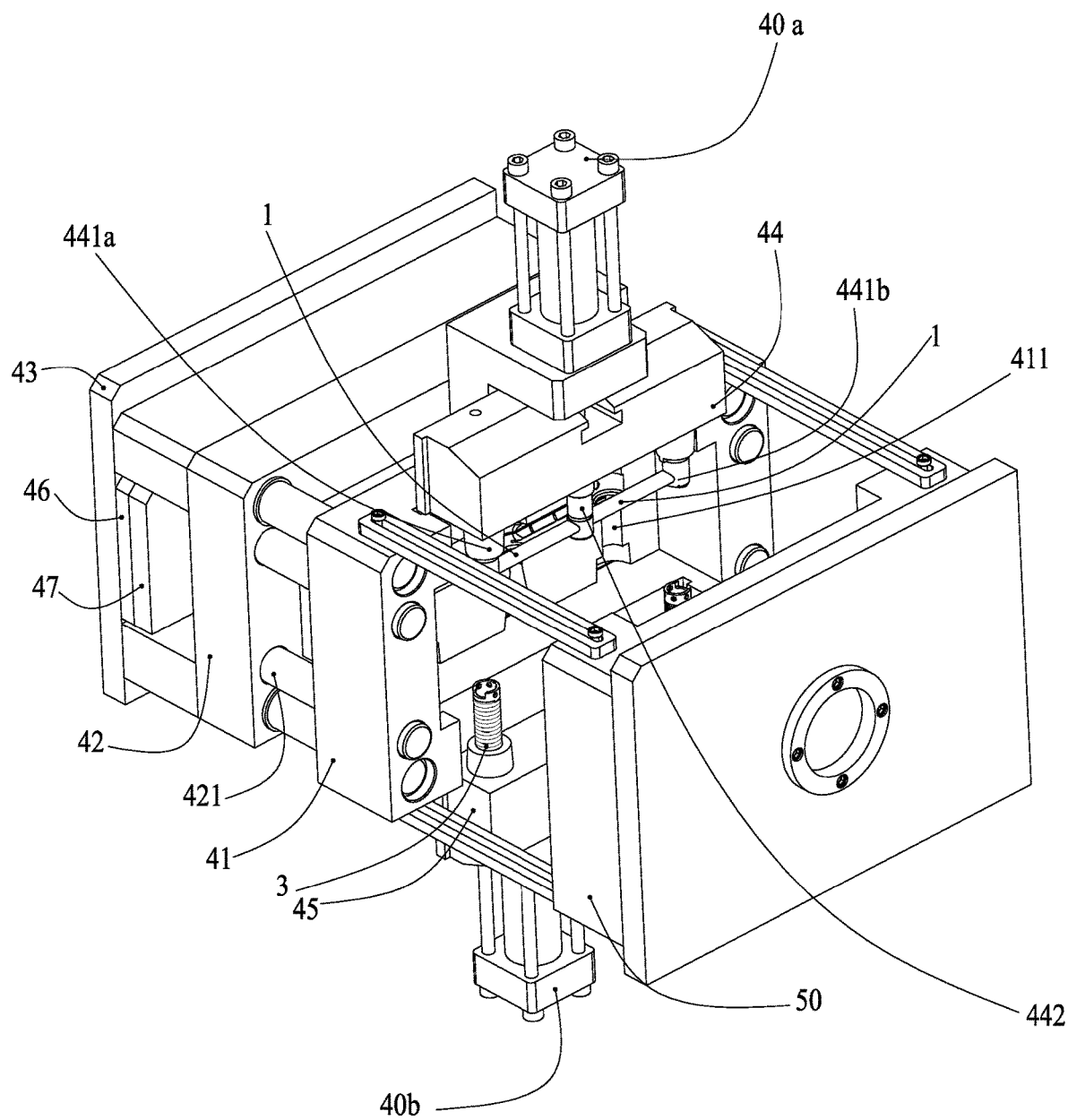
FIG. 6 is a schematic diagram showing the movable mold plate and the fixed mold plate according to the present application in a parted state and an upper slider fixing a main body inner core, a left water channel core and a right water channel core of a lower slider respectively having a left metallic pipe and a right metallic pipe sleeved thereon.
Figure 7:
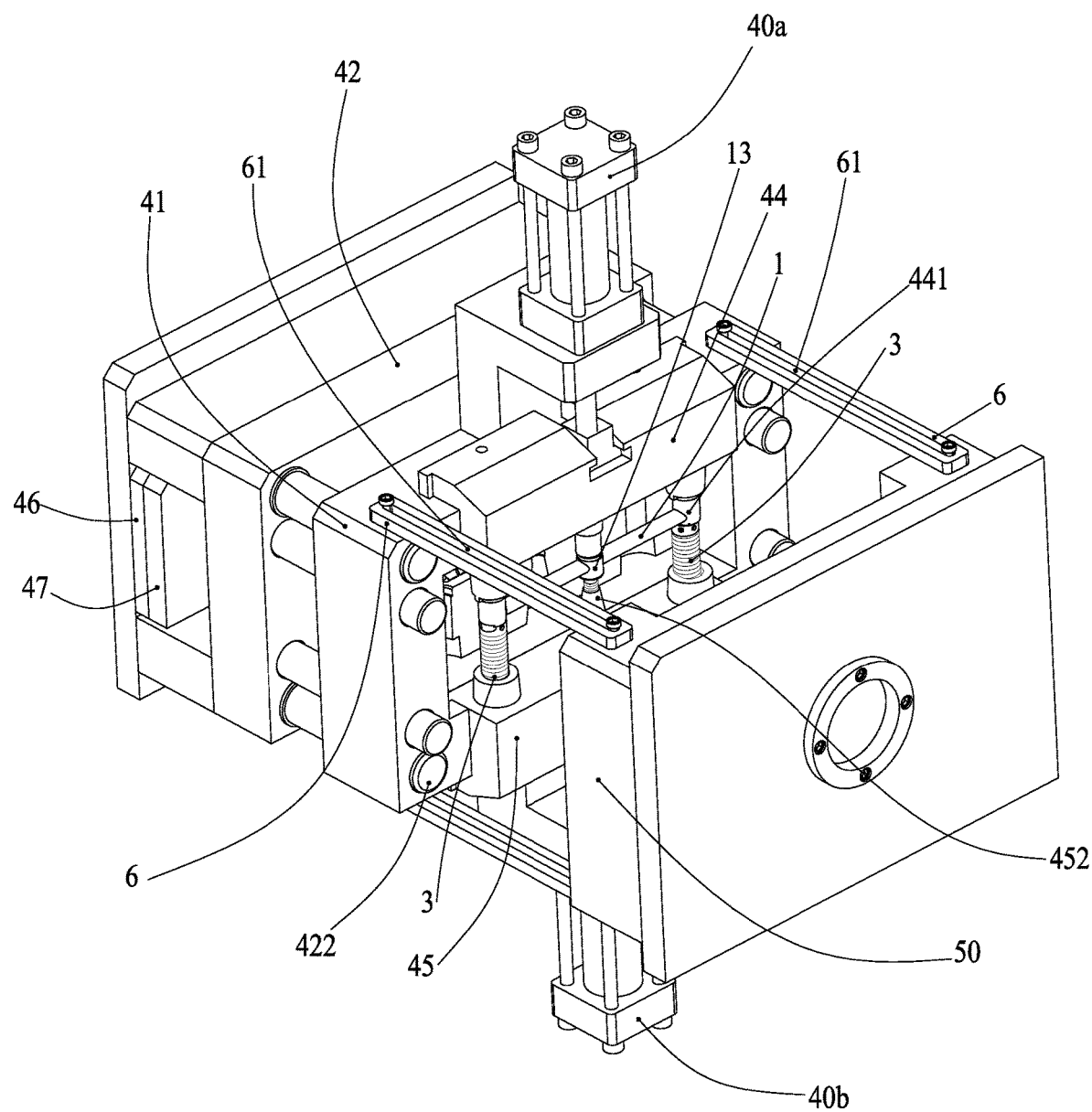
FIG. 7 is a schematic diagram showing the movable mold plate and the fixed mold plate according to the present application in a parted state and the upper slider and the lower slider approaching each other to clamp the main body inner core.

As shown in FIG. 6, the movable mold plate 41 is further provided with an upper slider 44 and a lower slider 45. The upper slider 44 and the lower slider 45 are separately controlled by their respective oil cylinders 40 to be movable up and down at the rear mold cavity 411 side of the movable mold plate 41. Specifically, the upper slider 44 is provided, at its bottom part, with a left valve spool core 441a, a right valve spool core 441b, and a middle upper water outlet core 442 corresponding in shape to the desired injection-molded product. The lower slider 45 is provided, at its upper part, with a left water channel core 451, a right water channel core (not shown and having the same structure as that of the left water channel core) and a middle lower water outlet core 452 (as shown in FIG. 7) corresponding in shape to the desired injection-molded product. The fixed mold plate 50 is provided, on a side facing toward the movable mold plate 41, with a front mold cavity preset according to the shape of the desired injection-molded product, and the fixed mold plate 50 is further provided with guide post insertion holes (not shown) in the periphery thereof. Four puller bars 6 are arranged between the side walls of the movable mold plate 41 and the fixed mold plate 50, which are arranged at four corners of the side walls. Each of the puller bars 6 is provided with a position-limiting sliding slot 61, and the movable mold plate 41 and the fixed mold plate 50 are each fixedly provided with positioning pins 401 on four corners of side walls thereof. The positioning pin 401 is arranged to pass through the position-limiting sliding slot 61 of the puller bar 6. Once the movable mold support plate 42 and the movable mold plate 41 move away from the fixed mold plate 50, each of the positioning pins 401 provided on the movable mold plate moves in the position-limiting sliding slot 61 of the corresponding puller bar 6 until the positioning pin 401 and the end of the position-limiting sliding slot 61 abut against each other, and in this case, the movable mold plate 41 cannot move further, and thereby separating the movable mold support plate 42 from the movable mold plate 41. When the movable mold plate 41 moves forward to abut tightly against the fixed mold plate 50, the rear mold cavity 411 of the movable mold plate 41 and the front mold cavity of the fixed mold plate 50 (not shown) are combined to form a complete mold cavity. The complete mold cavity is consistent in shape with the product of the main body injection-molded part 2, and the main body inner core 1 and the left and right metallic pipes 3 are preset in the complete mold cavity.

The present application further discloses a molding method for producing the faucet main body structure, the method includes the following seven steps.

Figure 5:
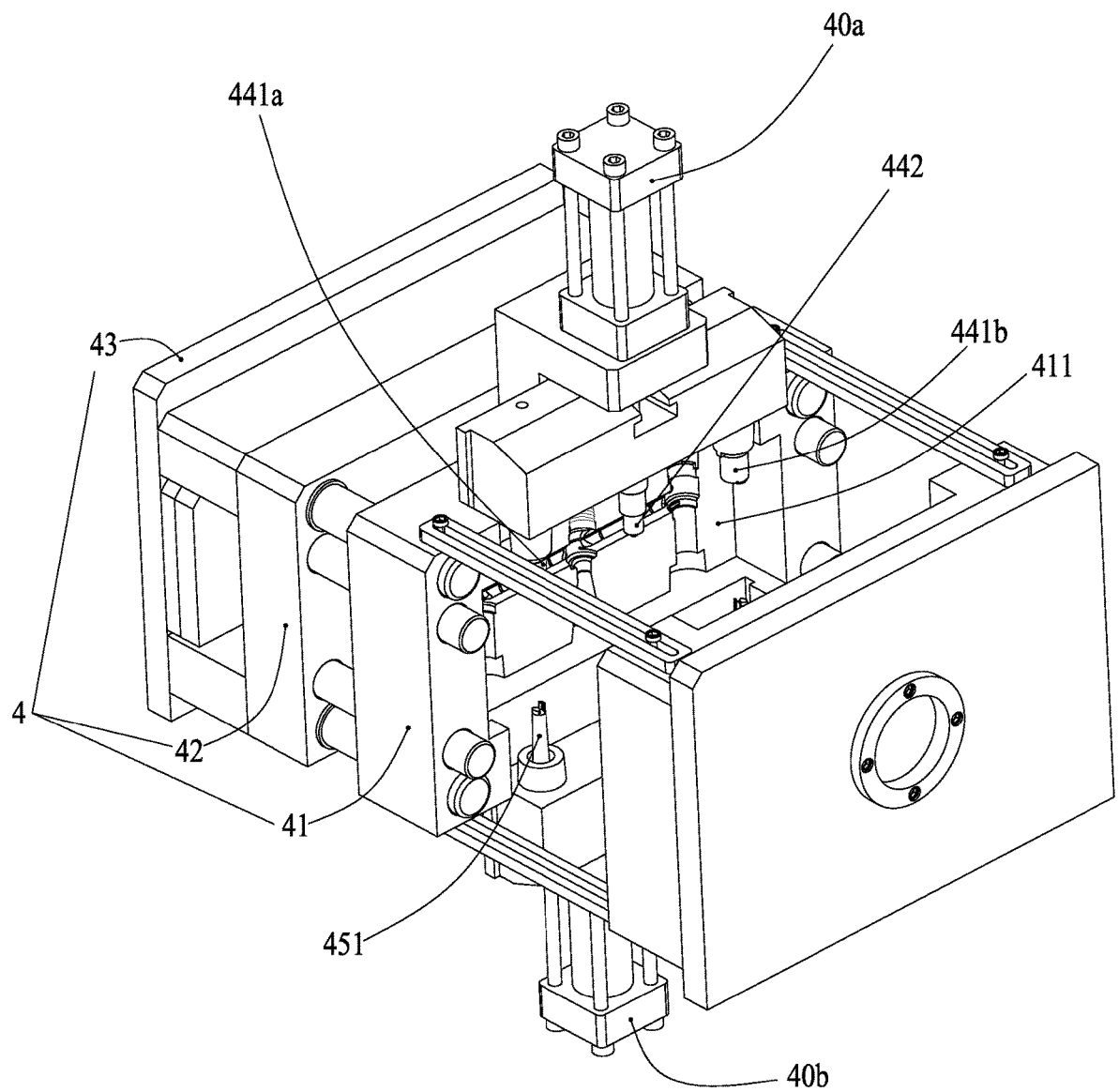
FIG. 5 shows a movable mold plate and a fixed mold plate according to the present application in an initially parted state.

In step 1, as shown in FIG. 5, first, the movable mold clamping plate 43 and the movable mold support plate 42 are pulled away from the movable mold plate 41, and the ejector support plate 46 and the ejector retainer plate 47 on the movable mold clamping plate 43 move backward along with the movable mold clamping plate 43; the guide posts 421 on the movable mold support plate 42 also move backward along with the movable mold support plate 42; specifically, the upper slider 44 of the movable mold plate 41 slides upwards, and the lower slider 45 of the movable mold plate 41 slides downwards, thus opening the rear mold cavity 411 of the movable mold plate 41.

In step 2, as shown in FIG. 5, the left and right metallic pipes 3 are sleeved on the left water channel core 451, the right water channel core of the lower slider 45 respectively; and the middle vertical water-passing joint 13 of the main body inner core 1 is sleeved upwards tightly onto the middle upper water outlet core 442 below the upper slider 44 and has an interference fit with the middle upper water outlet core 442; inwardly concaved circular arc-shaped cutouts 12 provided on two sides of the main body inner core 1 exactly tightly fit against inner side walls of the left valve spool core 441a and the right valve spool core 441b below the slider, such that the main body valve spool 1 is stably arranged under the slider and will not fall off.

In step 3, as shown in FIG. 7, the upper slider oil cylinder 40a pushes the upper slider 44 to move downwards, while the lower slider oil cylinder 40b pushes the lower slider 45 to move upwards, to cause the left valve spool core 441a and the right valve spool core 441b of the upper slider 44 to downwardly approach upper ends of the left metallic pipe 3 and the right metallic pipe 3 to form molding cavities of the water inlet pipes 211, which facilitates the formation of the water inlet pipes 211 in the subsequent secondary injection molding; the middle lower water outlet core of the lower slider 45 is inserted into the lower end of the water-passing joint 13 of the main body inner core 1 and abuts tightly against the water-passing joint 13 of the main body inner core 1.

Figure 8:
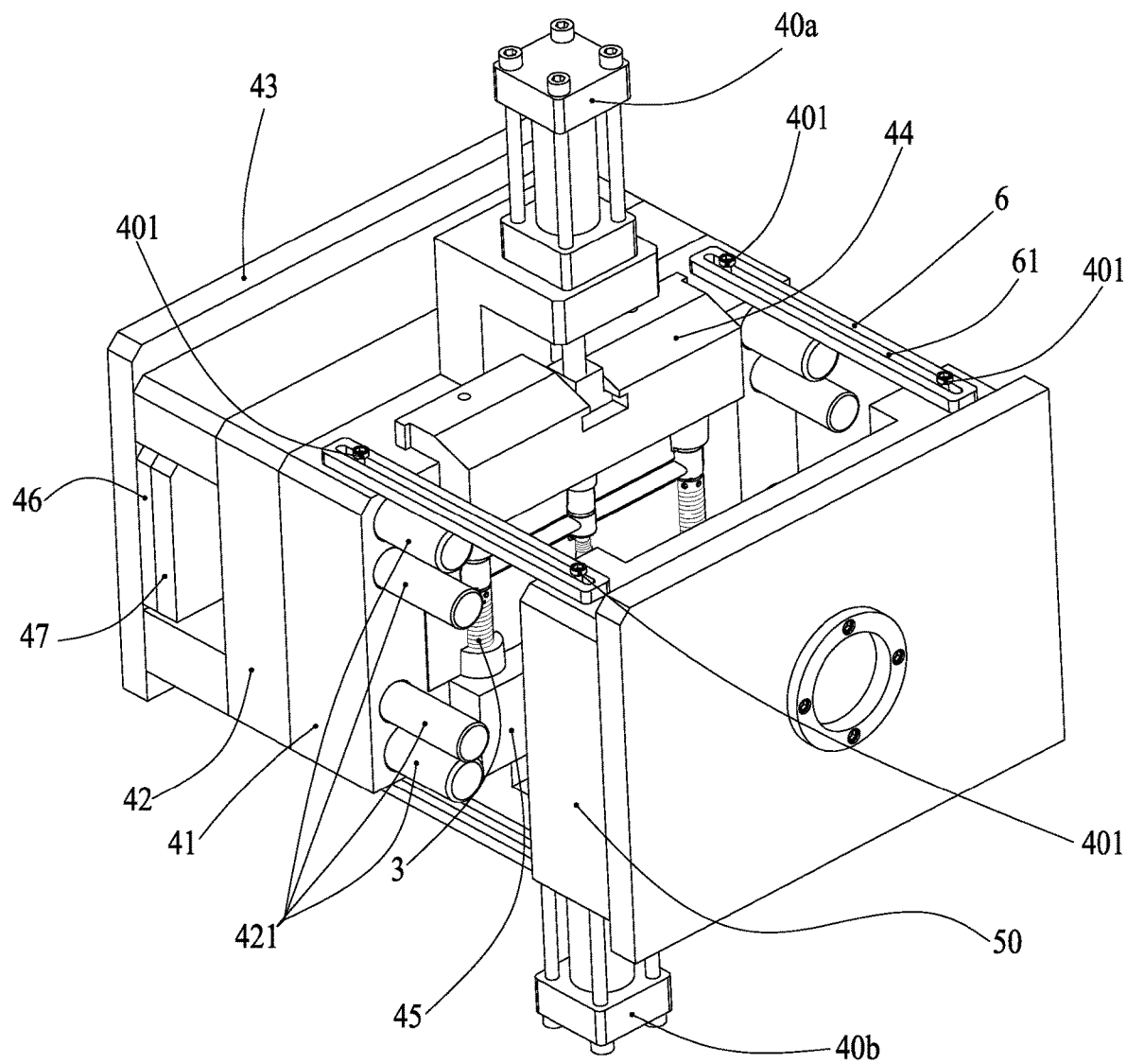
FIGS. 8 to 9 are schematic diagrams showing the transition of the movable mold plate and the fixed mold plate according to the present application from parted to closed.
Figure 9:
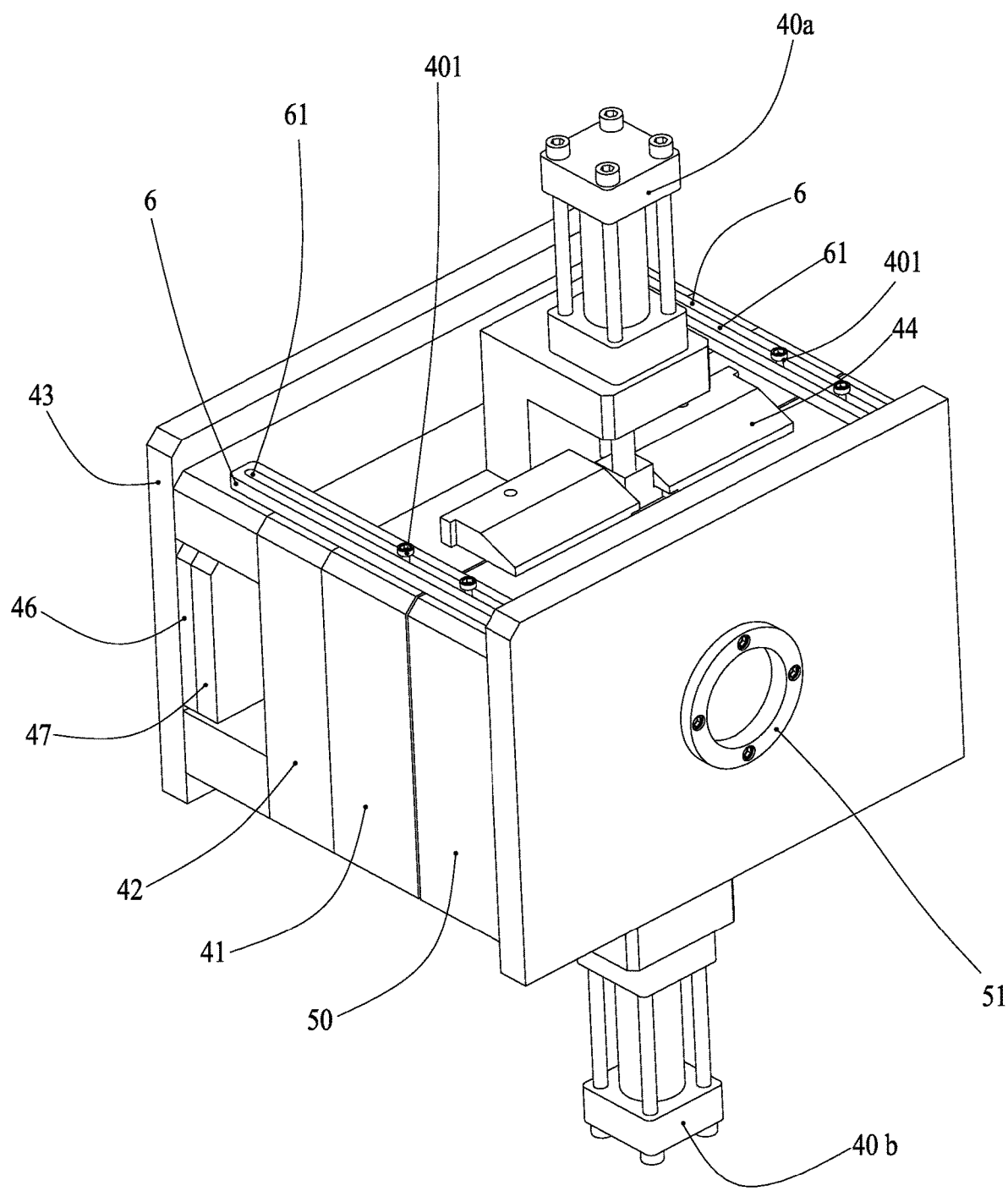

In step 4, as shown in FIG. 8 and FIG. 9, the movable mold clamping plate 43 is driven to push the movable mold plate 41 inward, such that the movable mold plate 41 moves towards the fixed mold plate 50 by means of the positioning pins 401 and is closed to the fixed mold plate 50, and meanwhile, the guide posts 421 of the movable mold support plate 42 pass through the periphery of the movable mold plate 41, and are further inserted into the guide post insertion holes in the periphery of the fixed mold plate 50, such that the movable mold plate 41 and the fixed mold plate 50 are closed to form a complete mold cavity, the complete mold cavity is consistent in shape with the product of the main body injection part 2; the main body inner core 1, the left and right metallic pipes 3 are preset in the complete mold cavity.

In step 5, as shown in FIG. 9, a molten plastic liquid is injected through an injection molding port 51 in the fixed mold plate 50 for secondary injection molding, and is cooled and molded into the faucet main body structure 100.

In step 6, as shown in FIG. 10 and FIG. 11, after the secondary injection molding, the oil cylinders 40 are first controlled to move the upper slider 44 upward to pull the left valve spool core 441a, the right valve spool core 441b and the middle upper water outlet core 442 away from the valve spool accommodating chambers 21 at the left and right sides of the faucet main body structure 100 and the upper end of the water-passing joint 13 of the faucet main body structure 100 respectively; and to move the lower slider 45 downwards, to pull the left water channel core 451, the right water channel core and the middle lower water outlet core 452 away from the water inlet pipes 211 at the left and right sides of the faucet main body structure 100 and the lower end of the water-passing joint 13 of the faucet main body structure 100 respectively, to realize core pulling, and then the movable mold plate 41 is parted from the fixed mold plate 50.

In step 7, after the core-pulling, the movable mold plate 41 and the fixed mold plate 50 are completely separated, and since the movable mold plate 41 is restrained by the puller bar 6, and is separated from the movable mold support plate 42, at this time, the ejector support plate 46 and the ejector retainer plate 47 of the movable mold clamping plate 43 are pushed towards the movable mold plate 41, as shown in FIG. 12, such that the front heads 521 of the ejector pins are passed through the movable mold support plate 42 and the movable mold plate 41, and further eject the molded faucet main body structure 100 out from the rear mold cavity 411 of the movable mold plate 41 to complete product collection, and thus the faucet main body structure 100 is obtained, at this time, the mold is restored to the open state as shown in FIG. 5.

Since the main body inner core 1 facilitates the tightly upwardly sleeving of its middle vertical water-passing joint 13 onto the middle upper water outlet core 442 below the upper slider 44, and the two sides of the main body inner core 1 are provided with the inwardly concaved circular arc-shaped cutouts 12 which exactly tightly fit against the inner side walls of the left valve spool core 441a and the right valve spool core 441b below the upper slider, and the two ends of the through pipeline 11 of the main body inner core 1 are clamped by the left valve spool core 441a and the right valve spool core 441b, therefore, there is no need to provide the main body inner core 1 with the positioning structure, the position-limiting structure, the positioning protruding bit and other structures mentioned in the background art for fixing; moreover, after the upper slider and the lower slider are clamped tightly, the middle lower water outlet core of the lower slider is inserted into the lower water outlet portion below the main body inner core 1, such that the main body inner core 1 is further fixed in the complete mold cavity, and even if during the secondary injection molding, the secondary plastic injection molding has a greater impact on the main body inner core 1, since the main body inner core 1 is effectively fixed in four directions, the main body inner core 1 is firmly clamped in the complete mold cavity without any deviation, so that the result of the injection molding can be achieved completely according to the established shape, and since the main body inner core 1 no longer needs to be provided with the positioning structure, the position-limiting structure, the positioning protruding bit and other structures mentioned in the background art, it is not prone to generate gap between the main body injection layer 20 and the main body inner core 1, and the faucet main body structure 100 is not prone to occur water dripping and leakage.

The invention claimed is:

1. A faucet main body structure, comprising a main body inner core, a main body injection-molded part and two metallic pipes, characterized in that the main body inner core is composed of a through pipeline and a water-passing joint which are integrally injection-molded, the through pipeline is penetrated axially, and has inwardly concaved circular arc-shaped cutouts arranged at its two ends, and an outer contour surface of the through pipeline is a circular arc-shaped transitional surface; the water-passing joint is arranged at a radial position of the through pipeline and perpendicularly cross the through pipeline, the water-passing joint is cylindrical, and is penetrated in the axial direction, and has radial ends in communication with a waterway in the through pipeline, the water-passing joint has an axial length X and a radial length Y, both of which are greater than the longest distance Z between radial ends of the through pipeline, and also an outer surface of each of the through pipeline and the water-passing joint is smooth; the main body injection-molded part comprises a main body injection-molded layer, two valve spool accommodating chambers and two water inlet pipes, the main body injection-molded layer is over-molded on an outer surface of the main body inner core, and has an upper water outlet and a lower water outlet extending outwards at the water-passing joint; the two valve spool accommodating chambers are respectively located at outer sides of the circular arc-shaped cutouts on the two sides of the through pipeline, each of the valve spool accommodating chambers is hollow inside, and has a chamber wall facing towards the through pipeline side tangent to the circular-arc shaped cutout of the through pipeline; the two water inlet pipes are respectively located at lower ends of the two valve spool accommodating chambers, and the water inlet pipes are in communication with waterways of the valve spool accommodating chambers respectively; and the two water inlet pipes are respectively fixedly arranged inside the metallic pipes.

2. The faucet main body structure according to claim 1, characterized in that each of the metallic pipes has an outer wall provided with external screw threads.

3. The faucet main body structure according to claim 1, characterized in that each of the metallic pipes on the two sides has a top end provided with a plurality of positioning perforations, and an outer peripheral wall of each of the water inlet pipes is fitted and fixed to the positioning perforations of the corresponding metallic pipe by an injection molding process.

4. The faucet main body structure according to claim 1, characterized in that the water-passing joint is provided with internal screw threads on its inner wall at its upper end.

5. The faucet main body structure according to claim 1, characterized in that the upper water outlet of the main body injection-molded layer is provided with external screw threads on its outer wall, and the lower water outlet of the main body injection-molded layer is provided with internal screw threads on its inner wall.

* * * * *